June 3, 1924.

G. C. HURRELL 1,496,641

MIXING, INCORPORATING, AND DISINTEGRATING MACHINE

Filed Sept. 21, 1923  3 Sheets-Sheet 1

Inventor
Guy Clement Hurrell
By
Pennie, Davis, Marvin & Edmonds
Attorneys

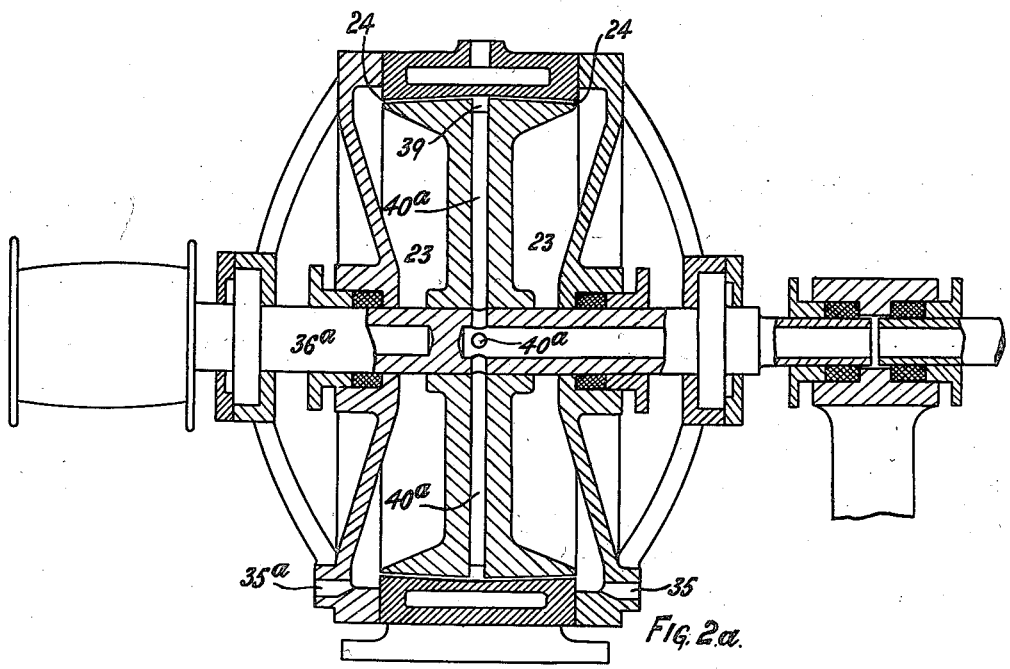

June 3, 1924.

G. C. HURRELL 1,496,641

MIXING, INCORPORATING, AND DISINTEGRATING MACHINE

Filed Sept. 21, 1923   3 Sheets-Sheet 3

Patented June 3, 1924.

1,496,641

UNITED STATES PATENT OFFICE.

GUY C. HURRELL, OF LONDON, ENGLAND.

MIXING, INCORPORATING, AND DISINTEGRATING MACHINE.

Application filed September 21, 1923. Serial No. 663,959.

*To all whom it may concern:*

Be it known that I, GUY CLEMENT HURRELL, of 51 Ulundi Road, Blackheath, London, England, having invented certain new and useful Improvements in Mixing, Incorporating, and Disintegrating Machines, do hereby declare that the following is a full, clear, and exact description of the same.

This invention relates to that type of mixing, disintegrating or homogenizing machine comprising a high speed rotor having a working surface in close proximity to a working surface of a stator or of a second rotor rotating in the opposite direction to the first, a narrow clearance gap being left between the rotating and the stationary or between the oppositely rotating surfaces through which gap pass liquids to be mixed, or liquids and solids to be incorporated, or solids in suspension to be disintegrated.

The improved constructions hereinafter described are best adapted to machines in which the surfaces bounding the gap are smooth or have slight protuberances, and in which the clearance gap is so narrow that in the materials contacting with the surfaces (rapidly moving relatively to each other) fresh adhesions and severances are formed with great rapidity, resulting in an intimate mixture and in the splitting up of friable solids in suspension.

In the operation of prior machines the film in the gap tends to be flung out to the larger diameter or exit of the gap due to its inertia, centrifugal force, and to the disposition of the liquid mass which is in the plane of rotation in a disc machine, and approaching thereto in a conical rotor machine of substantial conicity. This tendency of the liquid film to evacuate the clearance gap in prior machines is found in practice to cause the materials being treated, while entering in a continuous stream, to pass between the part of the working surfaces of major diameter in the form of detached patches or particles with voids and cavities between; the formation of these cavities being induced by the greater peripheral speed of the liquid at the larger diameter and the greater area of the gap at the larger diameter.

This physical condition of the materials in the working gap brought about by prior machines is found to be not best suited for forming emulsions, for disintegrating solids in liquid suspensions, or for other purposes for which such film mills are used in industry.

It is also found that in already known mills the time during which the materials to be treated remain in the gap cannot easily be controlled, since the materials entering at the smaller diameter tend to be at once expelled, the retardation effect produced by frictional resistance being inconsiderable compared with the accelerative action of centrifugal force.

In machines made in accordance with my invention the working gap is of such a form that with any speed of rotation the materials do not tend to leave the gap by reason of the inertia of the contents thereof, but are forced therefrom by fluid pressure.

I make the working gap either in the form of a cylindrical sheet so that the film of liquid passing through the gap is not accelerated by the action of centrifugal force on the film while it is in the gap, or I make the gap in the form of a conical sheet with the liquid entrance at the wide end so that the flow of the film tends to be retarded and not accelerated by the action of centrifugal force on the liquid while it is in the gap, or, if I admit the liquid at the smaller end of the gap, I adopt a form in which the gap is of very slight conicity, (enough for purposes of adjustment only) so that the accelerative action of centrifugal force on the liquid as it passes through the gap is negligible compared with the retardation effect due to surface adhesion and negligible compared with the propelling effect of the feed pressure which determines the rate of flow. Restated briefly, in the machine of my invention the tendency of the film to evacuate the gap is either non-existent, negative, or negligible.

In the drawings accompanying the specification:—

Figure 2:
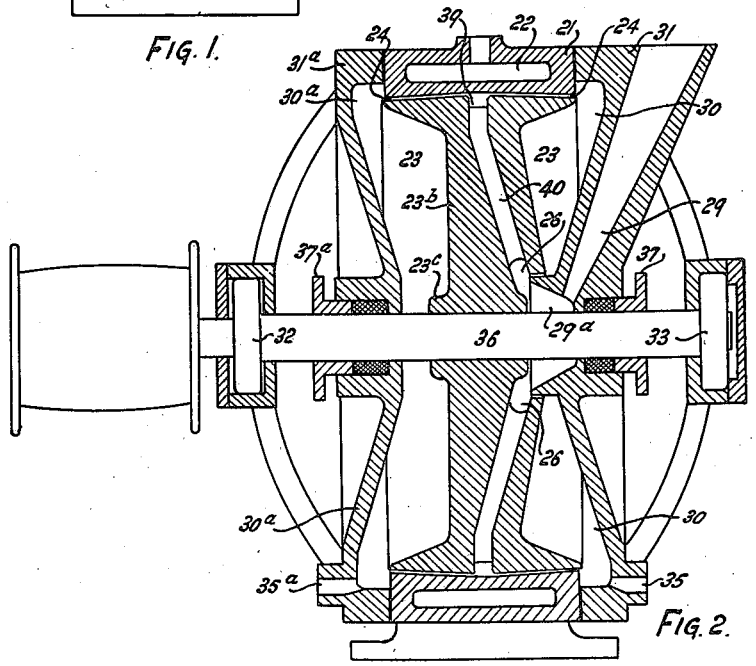
Fig. 2 is a section of an alternative form.

Fig. 2ᵃ is a view similar to Fig. 2 showing a modification.

Figure 4:
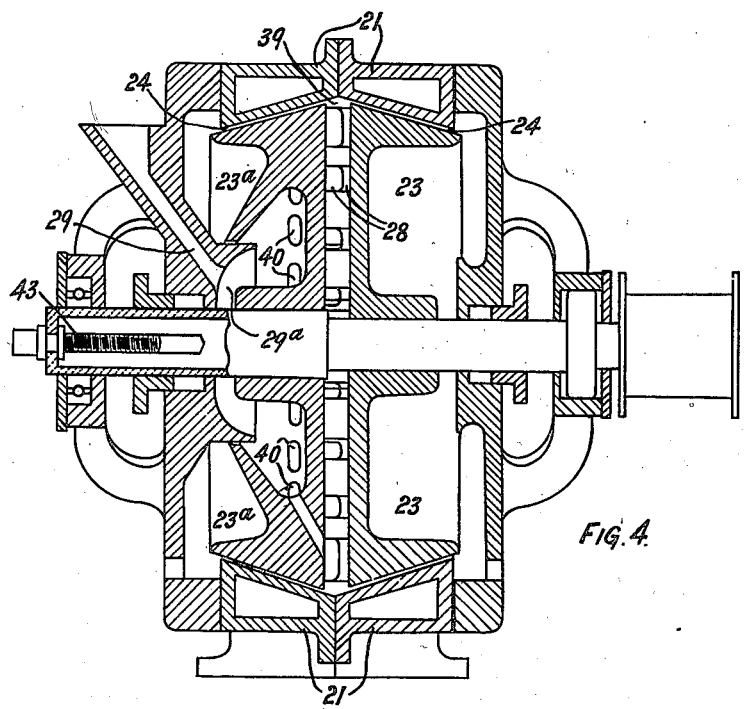

Fig. 4 shows a further modification.

Figure 1:
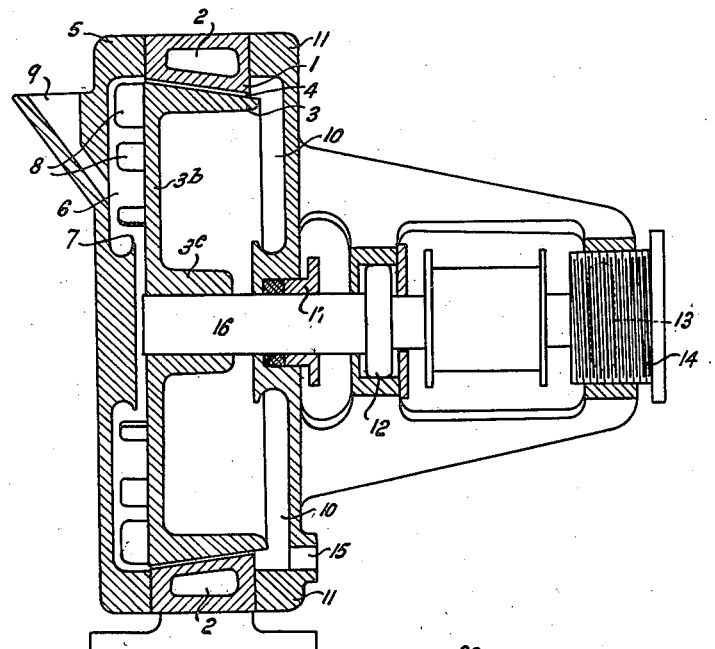
Fig. 1 is a section of one form of my machine.

In the machine shown in Fig. 1, 1 denotes an internally coned stator shell of short axial dimensions, preferably having an annular water or steam jacket 2.

Mounted within the shell coaxially therewith is a rotatable member 3, between which and the internal lateral wall of the stator 1 is left a narrow clearance gap 4. The rotor 3 is constructed as a simple pulley having a disc web 3$^b$ and a boss 3$^c$.

At one end of the stator is provided a cover 5 so shaped as to leave an annular space 6 extending from the gap 4 to near the axis. The inner circumferential boundary of the annular space 6 is preferably constituted by a lip 7.

Affixed to, or formed upon, the rotor disc 3$^b$, are radial blades or paddles 8 sweeping the annular space 6. A port or pipe 9 admits the materials to be treated to the space 6. The fluid materials are carried round by the blades 8, the action of which somewhat resembles that of the vanes of a centrifugal pump, and are thus subjected to fluid pressure tending to drive them through the working gap 4.

Where the surfaces of the gap 4 are parallel to the axis of rotation, the pressure head set up has to force the fluids through the confined space against the frictional resistance; where these surfaces are conical with the wider end at the entrance, the fluid pressure has, in addition, to overcome the component of the centrifugal force acting on the rotating film in the direction of the conical surfaces.

The machine would operate with the gap in the form of a diverging conical sheet, but, as already explained, this arrangement is open to objection.

The materials in traversing the axial length of the gap 4 make many revolutions, so that each particle may be assumed to traverse a helix of fine pitch before arriving at the exit end of the gap 4, from which the materials are received in a recess 10 of the end cover 11 whence they are discharged through the port 15.

The greater the rate at which the materials are fed into the port 9, the greater will be the mass of revolving liquid in the space 6, and the consequent pressure will promote the axial flow along the gap 4. It is clear, therefore, that the rate of flow, and accordingly also the duration and thoroughness of treatment, will be automatically regulated by the rate of feed of the liquid materials through the port 9.

The port 9 may be situated at or near the centre of the cover 5 in which case it will act like the suction or intake of a centrifugal pump capable of raising the untreated materials from a lower level. Preferably, however, I locate the port some distance from the axis of rotation so that the pressure of the revolving liquid may check or control the entry of fresh material.

The cover 11 is provided with bearings 12 and 13, one of which may be housed in a sleeve 14 adjustable in axial direction, for the purpose of regulating the width of the gap 4 where a tapered form is given to the working surfaces, or any well known type of thrust bearing may be mounted on the shaft and be actuated by usual means to effect the adjustment desired. When the rate of feed is comparatively low, that is, when very thorough treatment of the liquids is desired, the axial thrust is not of sufficient magnitude to cause injury to annular ball bearings of any of the usual types.

Owing to the fact that the liquids being treated in the mill are urged radially outwards by centrifugal force there is usually no leakage at the central opening through which the shaft 16 projects, but a gland 17 may be provided in the cover 11, if desired.

The blades 8 may be in the form of knives or cutters and may be of hard material for the purpose of pulverizing or comminuting solids in suspension which are too large to enter the gap 4. The surface opposed to the blades may be an abrasive surface aiding this preliminary disintegration.

Figure 3:
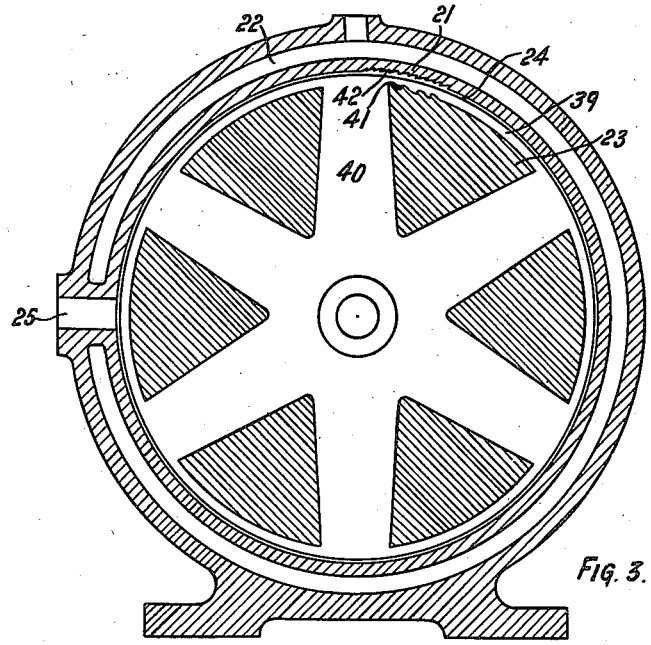
Fig. 3 is a cross section of Fig. 2.

For more intensive rates of feeding, and higher fluid pressures in the gap, I prefer to use the modified constructions shown in Figs. 2, 3, 2$^a$ and 4.

In the construction shown in Figs. 2 and 3, the inner periphery of the body or stator 21, which latter is preferably formed with a water jacket 22, comprises slightly tapered or conical surfaces cooperating with like surfaces on the external periphery of the rotor 23; the conicity of these surfaces is preferably very slight, for example 1 or 2 degrees.

The rotor 23 has a web 23$^b$ located approximately centrally between its end faces and integral with a boss 23$^c$ fitted to a shaft 36 having bearings 32 and 33. Where a slightly tapered rotor is used, one of these bearings, say 33, may be mounted on an adjustable sleeve as shown at 14 of Fig. 1, or any other well known means of effecting axial adjustment may be provided.

The liquids, treated in their passage through the gap 24 between the cooperating surfaces of the stator and rotor, are discharged into the end spaces 30 and 30$^a$, between the rotor and the covers 31 and 31$^a$, and run off through outlets 35 and 35$^a$, the covers 31, 31$^a$ being provided, if required, with glands 37 and 37$^a$.

The rotor 23 may be of simple form like the ordinary well known cast iron pulley with a peripheral annular groove 39 for the reception and distribution of the untreated materials which may be forced into the groove by way of the port 25 but are preferably fed by gravity through the tube or port 29, which may advantageously have a bell-mouthed enlargement 29$^a$, whence they pass into the groove 26. Holes 40 effect communication between the groove 26 and the annular groove 39. The holes 40 may extend almost to the periphery of the rotor, solid metal portions between adjacent holes presenting impellers.

In lieu of feeding the liquid to the mill as shown in Fig. 2, I may employ a hollow or partly hollow shaft 36ᵃ as shown in Fig. 2ᵃ, and lead through the rotor and shaft radial holes 40ᵃ communicating with the hollow interior of the shaft, one end (or both ends) of the shaft communicating (through a suitable gland) with a source of supply of liquid to be treated. With this arrangement the liquid may be elevated to a considerable height by suction set up by rotation of the fluid in the holes 40ᵃ.

When it is desired to effect a preliminary disintegration of solids in liquid suspension, cutting teeth 41 opposed by grinding or cutting surfaces 42 may be formed on the periphery of the rotor midway of its length.

Since the untreated liquids are delivered into the gap 24 midway of its length, there will be no unbalanced end thrust, and quite high pressures, for example 100 pounds per square inch, may be developed to induce the feed through the gap without causing any thrust, either radial or axial, upon the bearings.

As in the single-ended machine described and shown in Fig. 1, the rate of feed through the gap varies with the fluid pressure at 39. If the materials are fed in at 29 sufficiently fast, they will, at a given speed, largely fill the holes 40 and grooves 26 and 39, but if they are fed slowly, only a slight accumulation can form, with a correspondingly reduced pressure at 39, and flow through the gap 24. Thus, the rate of treatment follows automatically the rate of feed into the machine.

This rate of feed may be provided for by any external apparatus or means.

In the modification shown in Fig. 4 the rotor is in two parts 23 and 23ᵃ, in the form of truncated cones of moderate conicity disposed base to base. The cones when forced apart by rotation of the screw 43 or otherwise come closer to the conical interior face of the stator 21 and reduce the width of the working gap 24.

The blades 28 outstanding from the bases of the cones, in addition to performing their primary function of setting up fluid pressure and (if required) disintegrating solids in suspension, may be conveniently arranged to interlock to cause the two cones 23 and 23ᵃ to rotate together as a unit.

While it will be generally found most convenient to construct the hereindescribed machines with their axes horizontal, their construction permits of their use in a vertical or inclined position.

I claim—

1. A mixing, disintegrating or homogenizing machine comprising elements rotatable around a horizontal axis and presenting closely adjacent unbroken surfaces of revolution leaving between them a narrow annular gap bounded by continuous surfaces for passage of a film of liquid and means for setting up fluid pressure in the liquid entering the gap effective to impel the liquid through the gap, the angular relation of said surfaces of revolution to the axis of rotation being such that the component of the speed of the liquid parallel to said axis is unaccelerated in the passage of the liquid film through the gap.

2. A mixing, disintegrating or homogenizing machine comprising elements rotatable around a horizontal axis and presenting closely adjacent unbroken surfaces of revolution leaving between them a narrow annular gap bounded by continuous surfaces for passage of a film of liquid, and means for delivering liquid under pressure to the gap midway between the ends thereof effective to impel the liquid through the gap in both axial directions, the inclination of the said boundary surfaces to said axis of rotation being such that the flow of liquid through the gap takes place without acceleration in axial direction.

3. A mixing, disintegrating or homogenizing machine comprising elements rotatable about a horizontal axis and presenting closely adjacent unbroken surfaces of revolution leaving between them a narrow annular gap in the form of a cone of slight conicity and means for delivering liquid under pressure to a gap substantially midway between the ends thereof effective to impel the liquid between the gap in both axial directions.

In testimony whereof I have signed my name to this specification in the presence of two subscribing witnesses.

G. C. HURRELL.

Witnesses:
J. ILCORD,
M. LIVINGSTON.